Inventor
Peder B. Hoye

Feb. 9, 1943.   P. B. HOYE   2,310,787
FRICTION BRAKE MECHANISM FOR MOTOR DRIVEN
ELECTRIC SWITCHES AND THE LIKE
Filed May 27, 1939    2 Sheets-Sheet 2
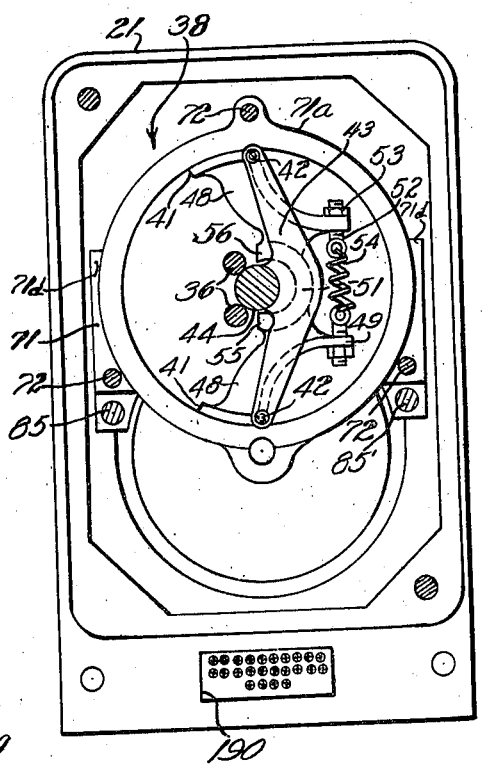
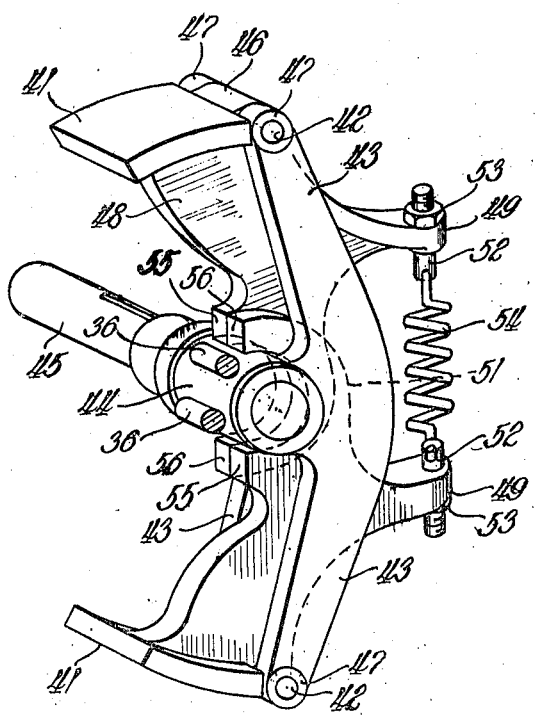
Inventor
Peder B. Hoye Patented Feb. 9, 1943

2,310,787

UNITED STATES PATENT OFFICE 2,310,787

FRICTION BRAKE MECHANISM FOR MOTOR DRIVEN ELECTRIC SWITCHES AND THE LIKE

Peder B. Hoye, Maywood, Ill., assignor to Electrical Engineers Equipment Co., Melrose Park, Ill., a corporation of Illinois Application May 27, 1939, Serial No. 276,040

6 Claims. (Cl. 192—8)

The present invention relates to an improved friction brake mechanism for motor driven electric switches and the like.

These motor driven operating mechanisms are frequently employed for the purpose of electrically opening and closing large disconnect switches and the like. The movable switch elements, generally in the form of relatively large switch blades, require substantial power for their operation, particularly in starting the movement of the blades. This power requirement is further accentuated in the case of outdoor installations where it is often necessary to break accumulations of ice. One of the features of the present invention is the employment, in an improved operating relation in such mechanism, of a direct current reversible motor of the series type, whereby the inherently high starting torque and high slow speed torque of this type of motor is available for initiating the movement of the switch blade and for completing such movement under the most adverse conditions, in either the opening or closing movement of the switch.

Upon deenergization of the electric motor, an automatic holding or self-locking function must occur so as to prevent the possibility of accidental backward rotation of the mechanism. For example, upon movement of the switch blade or blades from a lower position to a higher position, the blade or blades must be automatically held or locked in such elevated position against the action of gravity until the motor is again energized for actuation in the reverse direction. The use of worm gearing for obtaining this self-locking function introduces pronounced lubrication difficulties in cold weather. Adequate lubrication is decidedly important for worm gearing of irreversible or self-locking pitch, and the congealing of this body of lubricant in comparatively cold weather imposes added torque load upon the operating mechanism, and may even make the operation thereof very problematical. In my improved operating mechanism I preferably employ a spur gear speed reduction train. This spur gearing can be run substantially dry, with little or no lubrication, and hence seasonal temperature changes introduce no difficulties from congealed lubricant. The spur gearing is also cheaper and more efficient than worm gearing.

In order to facilitate the employment of spur gearing, and to obtain other operating advantages hereinafter described, I have devised an improved construction of mechanically actuated brake apparatus which automatically releases when the motor starts operating and automatically reengages when the motor stops operating. This brake apparatus is preferably interposed in the speed reducing gear train which has one end coupled with the electric motor and the other end coupled with the switch element. Said brake apparatus prevents rotation of said driving train in response to torque applied in either direction to the switch element end of the train, but permits rotation of the train in response to torque applied in either direction by the electric motor to the latter end of the train. It will be seen from this that the brake apparatus is only released when the torque is transmitted in one direction through the gear train, viz. in the direction leading from the motor end to the switch or load end; and that when torque is transmitted in a reverse direction from the load end back toward the motor end, as for example by the action of a gravity load on the switch parts, such backward transmission of torque cannot release the brake apparatus. This unidirectional torque released brake apparatus is superior to the conventional solenoid released brake apparatus because with the latter the maximum current flow to the solenoid coil occurs at the same time that the electric motor needs maximum current, and hence there must be provision for a considerably higher peak load of available operating energy. Moreover, the solenoid coil consumes energy during the entire time that the mechanism is operating, which is not true of the torque released brake apparatus. This torque released brake apparatus furthermore results in a very quick stopping of the electric motor and of the switch parts as soon as the current flow is interrupted, so that there is no objectionable coasting of the parts with resulting disturbance of the predetermined operating cycle.

My improved brake apparatus also functions in the additional capacity of an improved governor device by tending to maintain a constant load or burden on the motor. This is advantageous in the case of any type of motor but is of particular utility in the case of the series type of direct current motor which I preferably employ, whereby there is no possibility of the motor becoming released from all load and immediately accelerating to a destructive speed. Said improved brake apparatus also cooperates with the provision of means for hand cranking the operating mechanism. Provision for hand cranking is usually made so as to permit manually actuated emergency operation in the event of a failure of power supply or a breakdown of the operating mechanism. When the brake mechanism is of the solenoid type normally requiring the electrical energization of the solenoid coil for the release of the brake parts, it will be seen that substantial complication must be introduced to effect the emergency release of this brake mechanism to permit hand cranking. Such is avoided in my improved construction wherein the transmission of torque from the motor end of the gear train, whether arising from the electric motor or from hand cranking, effects the desired release of the brake apparatus. In this regard, my improved torque released brake apparatus further functions as a friction lock for the switch parts, which enables the electric motor to be entirely removed from the assembly for inspection or repair, without permitting a gravity load or any other force on the switch parts causing them to move to another position.

Other features, objects and advantages of the invention will appear in the following detailed description of one preferred embodiment thereof. In the accompanying drawings illustrating such embodiment:

Figure 2 is a transverse sectional view taken approximately on the plane of the line 2—2 of Figure 1, and Figure 3 is a fragmentary perspective view showing the construction and mounting of the pivoted shoe elements in the torque released brake apparatus.

Figure 1:
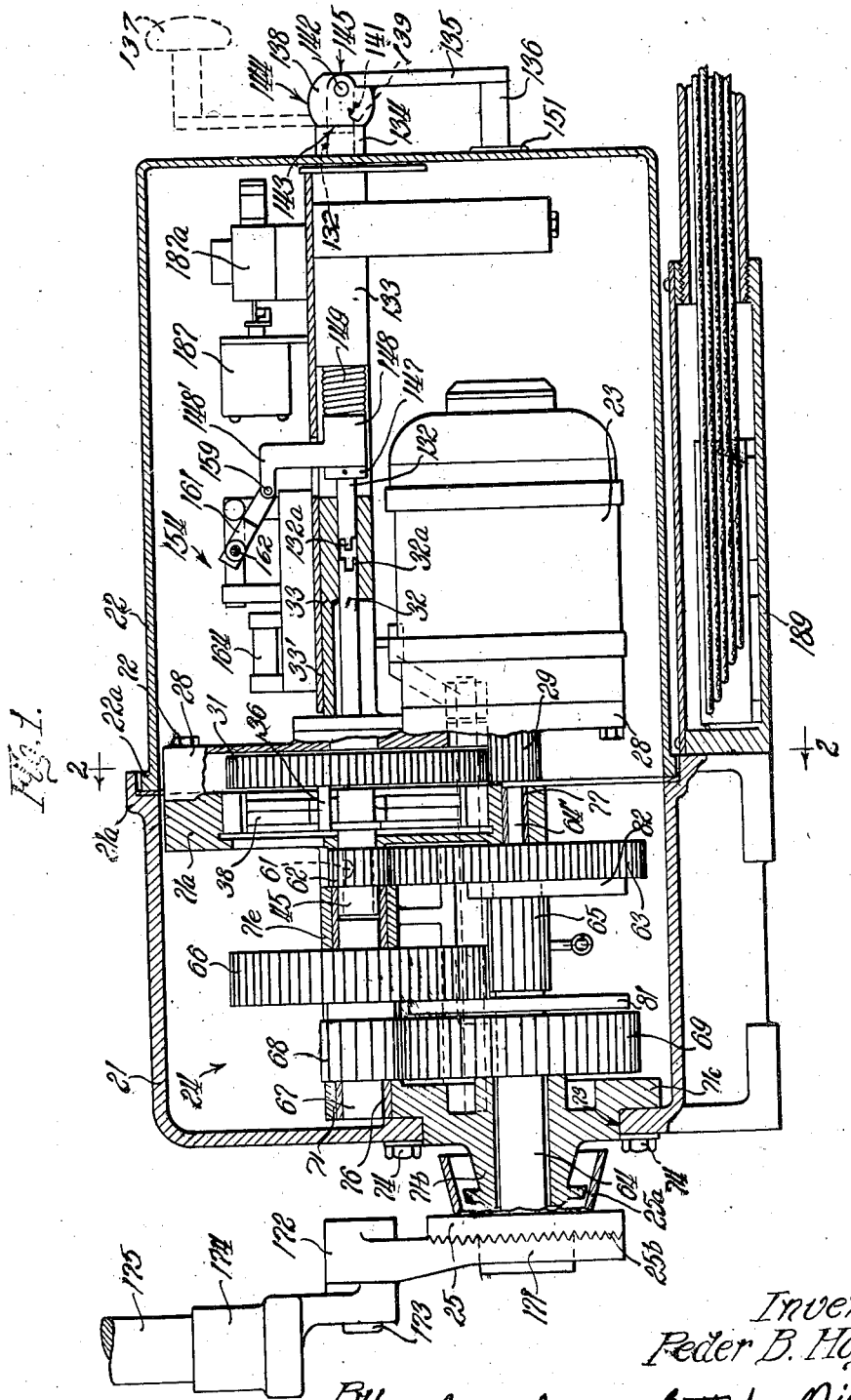
Figure 1 is a longitudinal sectional view through the improved motor operator.

Referring first to Figure 1, the mechanism is enclosed within a housing comprising a left hand casing section 21 and a right hand cover or casing section 22, these two sections having joining or coupling flanges 21a and 22a. Disposed within the casing section 22 is the electric motor 23 which drives the mechanism. Disposed within the casing section 21 is the speed reducing gear train or power transmission mechanism 24 which has one end coupled with the electric motor 23 and has its other end coupled with the switch actuator 25. As will be later described, the actuator 25 is the final driving element, having a slow speed, high torque oscillation of a half revolution in one direction and then a half revolution back in the reverse direction to the original position. This oscillatory movement of the actuator 25 can be transmitted to the switch blades of the disconnect switch through rotatable shafting, through crank and link connections, or through any combination of these two. It will thus be seen that a complete operating cycle comprises a half cycle rotation of 180 degrees of the actuator 25 in one direction, and a reverse half cycle rotation of 180 degrees back to the original position. This is the preferred cyclical arrangement, although it will be understood that different arrangements may be employed wherein each complete cycle includes a greater or lesser degree of angular movement.

The electric motor 23 is bolted at one end to a supporting bracket 28 which has suitable stationary mounting within the housing 21—22. A spur pinion 29 on the motor shaft meshes with a large spur gear 31 which is partially enclosed within the motor supporting bracket 28. This large spur gear is secured fast to a shaft 32 which has bearing support in the bracket 28 and which extends forwardly through a stationary bracket 33 disposed above the motor 23. The latter end of the shaft 32 has a diametrical slot or kerf 32a for receiving a companion tongue on the adjacent end of the hand cranking shaft, as I shall later describe.

Projecting from the opposite side of the large spur gear 31 are one or more driving pins or lugs 36 adapted to transmit rotation to the torque released brake apparatus. I preferably employ two spaced pins or studs 36—36 which are rigidly secured within the hub or web portion of the gear 31 (Figure 2), although, if desired, a small bracket may be secured to the side of the gear with an arcuate lug projecting therefrom in lieu of the two pins shown. The torque released brake mechanism which is driven through these two power transmitting pins 36—36 is indicated at 38 in its entirety in Figures 1 and 2, and comprises a stationary brake drum 71a within which are adapted to revolve two brake shoes 41. The two brake shoes are duplicates and are pivotally mounted at 42 within a rotating brake shoe support comprising pairs of parallel arms 43. These pairs of spaced parallel arms are formed integral with a hub or boss structure 44 from one end of which projects a shaft 45, which is either formed integral with the hub 44 or is keyed thereto. Each shoe has a pivot lug 46 projecting from the end thereof and adapted to fit between the pivot lugs 47 formed at the extremities of the spaced supporting arms 43, the pivot pins 42 passing through the aligned lugs 46 and 47. Extending inwardly from each brake shoe is an integral web portion 48 which is formed with a laterally projecting boss 49 and with an inwardly extending offset semicircular portion 51. As shown in Figure 2, each boss 49 carries a threaded pin 52 which extends outwardly through the boss and receives an adjusting nut 53 over its outer end. The inner ends of these pins have eyes or any other suitable attaching means for connection with the ends of a tension spring 54. Adjustment of the nuts 53 on the pins 52 enables the tension of said spring to be adjusted. It will be obvious that this spring exerts the same rotative force on both brake shoes, tending to oscillate the latter outwardly into pressure engagement with the inner surface of the stationary brake drum 39. Referring again to Figure 3, each semicircular loop portion 51 terminates in an abutment shoulder 55 disposed adjacent to its respective brake shoe 41, and in a second abutment shoulder 56 disposed more remote from the brake shoe. As previously remarked, the two brake shoe castings are of duplicate construction, and, hence, when they are assembled in the relation illustrated in Figure 3 the near abutment shoulder 55 of one shoe is disposed alongside the far abutment shoulder 56 of the other shoe, and, similarly, the far abutment shoulder 56 of the first shoe is disposed alongside the near abutment shoulder of the second shoe. As shown in Figure 2, the central recess of each semicircular portion 51 is notched out to a sufficient depth so that these recesses do not abut against the hub portion 44 in either the engaged or released positions of the brake shoes. Figures 2 and 3 show the brake in an engaged condition, with the driving and releasing means 36—36 out of engagement with the releasing shoulders 55—56, and with the outer friction surfaces of the shoes pressed outwardly against the inner surface of the brake drum 71a under the tension of the spring 54. This corresponds to the normal condition of the mechanism with the electric motor inert and the brake serving to lock the mechanism against torque transmitted back through the switch actuator 25. It will be evident that when the electric motor is energized for either direction of rotation, the engagement of either one of the pins 36 against either pair of releasing shoulders 55—56 will exert a force tending to release the brake shoes. Thereupon, the brake shoe assembly revolves as a driven member for transmitting torque from the pins 36 on to the speed reducing gear train which conducts the drive on to the switch actuator 25. By adjusting the tension of the spring 54 through the pins 52 and nuts 53, the brake mechanism can be adjusted so that the friction shoes exert some frictional drag at any desired torque or range of torques acting through the pins 36; or that the friction shoes effect an entire release from frictional contact with the brake drum 71a at any desired torque or range of torques. I consider it to be the best practice to adjust the tension of this spring to the point that the friction shoes are entirely released from the brake drum before the motor reaches a dead stall. This gives the motor full opportunity to apply its maximum torque to the load if required. A governor action inherently follows in my improved brake apparatus because the friction load created by the brake shoes is greatest when the switch actuating load is light, but which friction load diminishes as the switch actuating load increases. The governor action increases the accuracy of the mechanism because it reduces the likelihood of wide speed variations, which may cause the motor to stop short of or to coast beyond the desired amount of movement. There is sufficient back gearing between the brake mechanism and the switch actuator 25 to insure that a relatively light tension in the spring 54 is adequate to resist any countertorques which might be transmitted backwardly through said switch actuator. The location of the pivot centers 42 in immediate proximity to the outer frictional surfaces of the brake shoes affords a maximum length of lever arm from the shoulders 55—56 to these pivot centers, and also minimizes any snubbing or servo action of the brake shoes for either direction of rotation. When using a direct current series motor the brake apparatus is adjusted so that the motor can never run free under any normal operating condition or even under accidental conditions. Of course, a shunt motor or any other motor may be employed.

Referring to Figure 1, the stub shaft 45 which projects rearwardly from the brake shoe assembly has a spur pinion 62 secured thereto by a key 61. This pinion drives a large spur gear 63 which is mounted for free rotation on a lower drive shaft 64. Projecting laterally from this large spur gear is a small spur pinion 65 which meshes with a large spur gear 66 mounted on an upper countershaft 67. The latter spur gear 66 carries a laterally disposed spur pinion 68 which meshes with a large spur gear 69 keyed to the drive shaft 64. Secured to said drive shaft, outside of the housing section 21, is the switch actuator 25 previously referred to. It will be seen from the foregoing that the motor drive is conducted through one stage of speed reducing gearing 29—31 before it reaches the torque released brake mechanism 38, and that after passing through this brake mechanism the drive continues through three more stages of speed reducing gearing 62—63, 65—66, and 68—69 before it reaches the switch actuator 25. It will, of course, be understood that a greater or leser number of stages of speed reducing gearing may be employed, and that the torque released brake mechanism may be disposed at other points in the power transmitting train between the motor and the switch actuator 25.

The stub shaft 45, main drive shaft 64, and countershaft 67, together with the gears which are mounted thereon, are supported in a gear supporting frame designated 71 in its entirety. The brake drum 71a previously described consists of a ring formed as an integral part of the frame 71 at the front end of the latter. Screws 72 (Figure 2) pass through the motor supporting bracket 28 and thread into tapped holes in the brake drum ring 71a for securing the motor supporting frame and the gear supporting frame together. The other end of the frame 71 is formed with a bearing 71b for the main drive shaft 64, this bearing projecting outwardly through an opening 73 formed in the end wall of the housing section 21. A bolting flange 71c abuts against the inner side of the housing section 21 around the opening 73 and receives the cap screws 74 which rigidly join this end of the frame 71 to the housing. The frame 71 also comprises longitudinal side portions 71d—71d extending from the brake drum portion 71a back to the bearing hub 71b and bolting flange 71c, these side portions being spaced to leave top and bottom openings which accommodate the gears 63, 66, and 69. A bridge portion 71e extends transversely between said side portions 71d to receive a suitable bearing bushing in which are journaled the rear end of the stub shaft 45 and the front end of the countershaft 67. The rear end of the counter shaft 67 is journaled in a bearing bushing 76 mounted in the rear end portion of the frame 71. The main drive shaft 64 has a front pilot extension 64' which is journaled in a bushing 77 mounted in the lower part of the brake drum portion 71a.

Referring now to the hand cranking mechanism, this mechanism comprises a cranking shaft 132 (Figure 1) which has bearing support at its inner end in the bracket 133, in axial alignment with the shaft 32. A transverse tongue 132a at the inner end of the cranking shaft 132 is adapted to engage in the transverse slot 32a in the front end of the shaft 32. The shaft 132 extends forwardly through the bracket 133 and projects out through a boss or collar 134 protruding from the front end of the housing section 22. The crank handle is illustrated in its folded position in full lines and in its operative position in dotted lines in Figure 1, said handle comprising the radially extending crank portion 135, the laterally extending stem 136, and the knob 137 at the end of said stem portion. The radially extending crank portion 135 is formed integral with a hub portion 138 which is adapted to have swiveled connection with the cranking shaft 132 for permitting the crank handle to be swung between the aforesaid full line and dotted line positions. To this end, the upper portion of the hub is formed with a relatively narrow slot 139 extending from end to end of the hub. The front end of the cranking shaft 132 is formed with a relatively long tongue 141 which extends into this slot 149. A transverse pivot pin 142 extends through the hub 138, to pass transversely through the slot 139 and through the tongue 141 to establish a hinge connection between the hand crank and the cranking shaft. The pin 142 is located relatively close to the outer end of the hub 138, and the inner end of said hub is formed with a substantially flat surface 143 which normally abuts against the outer surface of the boss 134. The top of the hub is formed with a rounded cam surface 144 extending from said flat inner surface 143 to a similar flat outer surface 145. Pinned to the shaft 132 between the brackets 33 and 133 is a collar 147. Abutting against this collar is the hub of a switch actuator 148 which is mounted on the shaft 132. A compression spring 149 is confined between the switch actuator 148 and the bracket 133, this spring normally tending to shift the cranking shaft 132 to the left for bringing the tongue 132a into coupled engagement with the slot 32a of shaft 32. When the hand crank 135 is in the full line position illustrated in Figure 1, the flat inner surface 143 of the hub 138 is in abutment against the outer end of the boss 134, in which position of the parts the shaft 132 is held in the forwardly retracted position shown. To establish the operative connection for hand cranking, the crank is swung upwardly around the pivot pin 142 into the dotted line position shown in Figure 1, which allows the front surface 145 of the crank hub to be brought back into engagement with the front surface of the boss 134. Such transposition of the hand crank to this other radial position permits the cranking shaft 132 to move rearwardly under the pressure of the spring 149, thereby bringing the tongue 132a into coupled engagement with the slot 32a which establishes a driving connection and enables the hand crank to rotate the large spur gear 31. When the hand crank is transposed or thrown back into its uncoupled position, as indicated in full lines, the knob 137 is brought to register in a pocket 151 formed in the front end of the casing section 22. If desired, any key controlled lock mechanism may be employed for locking the knob 137 within the pocket 151.

When the hand crank 135 is swung into its operative cranking position, indicated in dotted lines in Figure 1, it is desirable that the electric motor 23 be rendered completely inoperative so that there will be no possibility of an accidental energization of this motor during the hand cranking operation, and which accidental energization might injure the operator. Accordingly, the switch actuator 148 is provided, this element having operative connection with a master switch 154 which is disposed above the bracket 33. This master switch 154 is a double-pole, single-throw switch having the two poles or blades pivotally connected to the forward clips or terminals and having the swinging ends of the blades adapted to move into engagement with rearwardly disposed clips or terminals. The switch actuator 148 has an upwardly and rearwardly extending arm 148' which is pivotally connected at 159 with a motion transmitting link 161 composed of insulating material. This link is of T-formation and has its cross bar portion engaging between the two blades of the master switch 154. A pivot pin 162 of insulating material extends through the two switch blades and through this motion transmitting link 161, being suitably pinned in the link. As shown in Figure 1, when the hand crank 135 is in its inoperative position, with the shaft 132 in its forwardly retracted uncoupled position, the blades of the master switch occupy the rearwardly and downwardly thrown position illustrated, such closing the circuit connections through the switch and enabling the motor circuit to be completed through the associated control devices. However, as soon as the crank handle 135 is swung or transposed over to its operative position, the resulting rearward shifting movement of the shaft 132 transmits a rearward end thrust through the insulating link 161 and causes the two blades of the master switch to be oscillated upwardly into their open circuit position, such occurring before a coupling connection is established between the tongue 132a and the slot 32a. In this open circuit position, it is impossible for the motor 23 to become energized through accidental operation of the control devices. Fuses 164 are shown as being included in circuit with the master switch 154.

Referring to the switch actuator 25 through which the drive is transmitted from the operating mechanism to the disconnect switch, such actuator 25 comprises a hub portion which is rigidly secured to the drive shaft 64 and from which hub extends a circular skirt 25a tapering outwardly to surround a radial flange on the hub 71b, whereby to shed the weather, etc. A radially extending flange on the actuator 25 has radially extending teeth 25b on its outer face for matching with corresponding radial teeth on a cooperating coupling member. In Figure 1 this coupling member is designated 171 and is shown in the form of a crank having an outer crank hub 172 carrying a crank pin 173. Pivotally mounted on the pin 173 is a connecting rod coupling 174 secured to the end of a reciprocable connecting rod 175. The coupling member 171 is adapted to be secured to the actuator 25 by screws (not shown) which extend through arcuate slots in the coupling member and thread into tapped holes in the actuator. By the release of these screws, the coupling member 171 can be turned to a different position of angular adjustment relatively to the actuator 25 and then drawn back into rigidly coupled connection with the radial teeth of the actuator.

While I have illustrated and described what I regard to be the preferred embodiment of my invention, nevertheless it will be understood that such is merely exemplary and that numerous modifications and rearrangements may be made therein without departing from the essence of the invention.

I claim:

1. In friction brake mechanism of the class described, the combination of rotary driving and driven members adapted to revolve in either direction, a relatively stationary friction brake surface, a brake shoe rotating with said driven member and operative to have frictional engagement with said brake surface, a pair of abutment shoulders carried by said shoe through which brake releasing force is adapted to be transmitted to said brake shoe, said abutment shoulders having swinging movement about an axis extending substantially parallel to the axis of said driven member, and driving means rotating with said driving member for transmitting brake releasing force through one of said abutment shoulders for one direction of rotation and through the other of said abutment shoulders for the other direction of rotation.

2. In friction brake mechanism of the class described, the combination of rotary driving and driven members adapted to revolve in either direction, a relatively stationary friction brake drum, a brake shoe pivotally mounted on said driven member for swinging movement about an axis extending substantially parallel to the axis of said driven member and operative to have frictional engagement with said brake drum, means for normally holding said brake shoe against said brake drum, a pair of abutment shoulders carried by said shoe and through which brake releasing force is adapted to be transmitted to said shoe, and driving means rotating with said driving member for transmitting brake releasing force through one of said abutment shoulders during one direction of rotation of said driving member and for transmitting brake releasing force through the other of said abutment shoulders during the other direction of rotation of said driving member.

3. In friction brake mechanism of the class described, the combination of rotary driving and driven members adapted to revolve in either direction, a relatively stationary friction brake surface, a plurality of brake shoes pivotally mounted on said driven member for swinging movement about axes extending substantially parallel to the axis of said driven member and operative to have frictional engagement with said brake surface, a pair of abutment shoulders associated with each of said brake shoes and through which brake releasing force is adapted to be transmitted to each individual shoe, and driving means rotating with said driving member for transmitting brake releasing force through one set of said abutment shoulders for one direction of rotation and through the other set of abutment shoulders for the other direction of rotation.

4. In friction brake mechanism of the class described, the combination of rotary driving and driven members adapted to revolve in either direction, a relatively stationary friction brake drum, a plurality of brake shoes pivotally mounted on said driven member for swinging movement about axes extending substantially parallel to the axis of said driven member, spring means normally tending to hold said brake shoes pressed against said brake surface, a forward drive abutment shoulder and a backward drive abutment shoulder carried by each of said brake shoes and through which brake releasing force is adapted to be transmitted to the individual shoe, and driving means rotating with said driving member for transmitting brake releasing force through the forward drive abutment shoulders of each of said shoes during forward rotation and through the backward drive abutment shoulders to each of said shoes during backward rotation.

5. In brake mechanism of the class described, the combination of rotary driving and driven members adapted to revolve in either direction, a relatively stationary brake surface, a plurality of brake shoes movably mounted on said driven member, spring means normally tending to hold said brake shoes pressed against said brake surface, semi-circular yoke portions carried by each of said shoes and formed with abutment shoulders at the ends of the yoke arms disposed on approximately diametrically opposite sides of the axis of said brake mechanism, said abutment shoulders being adapted to have brake releasing force transmitted therethrough, and means rotating with said driving member for transmitting brake releasing force to said abutment shoulders at one side for one direction of rotation and to said abutment shoulders at the other side for the other direction of rotation.

6. For use with an electric switch and an electric motor driven operating mechanism for said switch, a mechanical brake comprising a rotary driving member for connection with said electric motor, a rotary driven member for connection with said electric switch, a relatively stationary brake surface, a pair of brake shoes rotating with said driven member, a spring having its opposite ends exerting equal spring energy against both brake shoes for normally holding said brake shoes against said brake surface, and torque transmitting means operative to transmit torque from said driving member to said driven member through said brake shoes and to release the braking engagement of said shoes against said stationary brake surface in proportion to the torque transmitted, said torque transmitting means comprising a lost motion relation between said driving and driven members.

PEDER B. HOYE.